Patented Aug. 10, 1926.

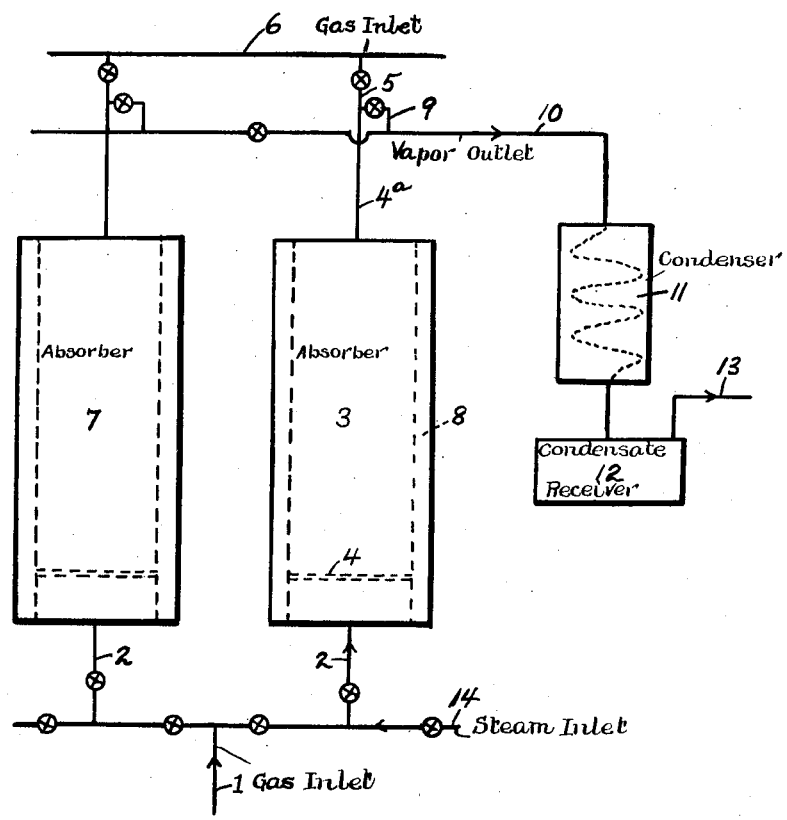

1,595,681

UNITED STATES PATENT OFFICE.

GEORGE G. OBERFELL, OF NEW YORK, N. Y., ASSIGNOR, BY MESNE ASSIGNMENTS, TO GASOLINE RECOVERY CORPORATION, A CORPORATION OF DELAWARE.

PROCESS FOR THE RECOVERY OF HYDROCARBON VAPORS AND DERIVATIVES THEREOF.

Application filed December 6, 1919. Serial No. 342,881.

My invention has relation to processes for the recovery of hydrocarbon vapors and derivatives thereof, from gaseous mixtures, and consists in certain novel and useful improvements in the same, fully disclosed in the following specification and particularly pointed out in the appended claims.

In many industrial operations it frequently happens that valuable vapors are lost by allowing them to escape with various amounts of gases which contain them. The processes heretofore employed for the extraction and recovery of such vapors from gaseous mixtures depend upon the principles of compression, refrigeration, and absorption in liquid absorbing media. For a description of these processes as applied for the extraction and recovery of gasoline from natural gas see Bureau of Mines Bulletins Nos. 88, 120, 151 and 176. In order to show how the principles underlying the processes are applied for the recovery of vapors from gaseous mixtures, a brief description of said processes as applied to the natural gas gasoline industry is herewith presented.

In the compression process the gas is compressed to pressures ranging from 50 to 300 pounds per square inch, and then cooled, part of the gasoline being thereby condensed and recovered from the gas. This process is not applicable, by present plant practice, to gas having a gasoline content much less than 1.5 gals. per M cu. ft. of gas, since the percentage efficiency of gasoline extraction is dependent, in present compression plant practice upon the gasoline content of the gas, and upon the vapor pressures of the recoverable hydrocarbons. In the absorption process the gas is brought into intimate contact with a liquid that absorbs the gasoline vapors from the gas. The gasoline is then separated from the absorbing medium by a distillation process. If naphtha is used as the absorbing medium this separation is not necessary. The absorption process is applicable to natural gas of either high or low gasoline content, and may be carried out with gas at either high or low pressures, but the cost of the installation and operation of an absorption gasoline plant will be greater at the lower pressure. The amount of gas necessary to make a profitable proposition for extraction of gasoline is dependent upon the gas pressure and upon the quality of the gas available for treatment. Owing to the high costs of gathering lines, equipment, erection and operation of compression plants, this process has not been used as a general practice in treatment of gas in quantities much less than about 50,000 cu. ft. of gas daily or stated in terms of plant production with a production much less than 150 gallons of gasoline daily. It is true that there are gasoline plants operating on as low a quantity of gas as 5,000 cu. ft. daily and producing only 50 gallons of gasoline daily (H. O. Westcott—Handbook of Casinghead gas p. 235), but the process has not met with general practice for reasons stated above. For the same reasons the absorption process has not met with general practice with gas in quantities much less than about 50,000 cu. ft. daily or with a production much less than 150 gallons of gasoline daily.

I have discovered that some solid substances such as highly activated charcoal, silica gel, iron gel, etc., are adapted for use as absorbent media for recovery of hydrocarbon vapors and derivatives thereof and since a solid absorbing medium has not heretofore been used commercially for such purposes, one of the objects of this invention is to provide a process whereby such media may be so employed.

Charcoal made from cocoanut shells, or other nut shells, peach pits, plum pits, hard coal, wood, etc., and which is made from such substances by first heating at about 1000° C. for about 12 hours with subsequent cooling and reheating with air, steam, carbon dioxide or other suitable oxidizing agent is particularly adapted for this purpose as by these means there is produced a charcoal of exceptional absorbing qualities. The property of absorbing the vapors at relative low temperature and again giving off these vapors at relative high temperature is more or less dependent upon the history of the charcoal as concerns its source and treatment during process of manufacture, charcoal made in United States prior to the year 1917 being comparatively unsuited for practical purposes in recovery of such vapors.

Owing to a more complete recovery and to a better separation of the very volatile hydrocarbons from the more stable or less volatile hydrocarbons, the gasoline produced from natural gas by this process is a more stable and better product than that produced by other processes.

It is also a fact that in the compression, refrigeration, and liquid absorption media processes not all of the gasoline is extracted from the gas. This invention, therefore, pertains to improvements in the processes of extracting hydrocarbon vapors and derivatives thereof from gaseous mixtures in that the method is applicable over a wider range of temperature and pressure, can be performed more economically and at lower pressures, requires less apparatus and gives a more complete recovery and better product than processes heretofore employed. The process also makes possible the treatment of gaseous mixtures which previously could not be economically treated.

In order that the invention may be more clearly understood, a drawing is filed herewith which shows diagrammatically a form of apparatus by means of which the process may be practiced. For simplicity of explanation, the process is described as being practiced on natural gas with activated charcoal as the absorbing medium. It is obvious that the process may be used for the recovery of hydrocarbon vapors and derivatives thereof from other gas mixtures regardless of the source or kind of gas.

Natural gas enters the apparatus by way of lines 1 and 2 to the absorber 3, which contains a filler of activated charcoal in granular form. The activated charcoal is supported in the absorber 3 by means of a screen or perforated plate 4. After passing through the absorber 3, the gas passes by way of lines 4ª and 5 to the residue line 6, where the gas is used for fuel purposes or disposed of otherwise, as desired. After allowing gas to flow in contact with activated charcoal in the absorber 3 until the charcoal has practically reached its allowable saturation point for complete removal of gasoline vapors, and before the allowable saturation point has been passed, the gas supply is diverted to another absorber such as 7, containing fresh activated charcoal or activated charcoal from which the gasoline vapors have been removed.

It is advisable to have three absorbers, or groups of absorbers in parallel and so connected to the gas supply, that one absorber or group of absorbers may be employed for extraction of vapors while another is undergoing a distillation process for removal of vapors and while the remaining absorber or group of absorbers is being cooled prior to use for absorption of vapors from a fresh supply of gas.

For removal of the absorbed vapors from the activated charcoal, the absorber 3 is heated by introducing steam into the jacket 8, or by circulating a hot fluid such as mineral oil through the jacket 8. If desired coils may be placed within the absorber, and heat also supplied to the activated charcoal by passing steam or hot fluid through the coils. The jacket and coils may also be used for cooling the absorbents prior to and during absorption of vapors from a fresh supply of gas by passing a cooling agent through the coils and jacket.

The vapors driven from the activated charcoal, pass by way of lines 4ª, 9 and 10 to the condenser 11, cooled by water or other suitable agent, thereby causing a condensation of vapors, the resulting liquid, flowing by gravity into the tank 12, and being suitable for use without further treatment. Any uncondensed vapors pass from the receiving tank 12 to the line 13 and may be then used for fuel or disposed of otherwise as desired. If desired, the vapors passing by way of line 13, may be passed through a liquid absorbing medium such as naphtha for further recovery of vapors or a further recovery of vapors may be obtained by compressing and cooling said uncondensed vapors.

If desired the distillation may be carried out under pressure by placing a pressure regulator on the line 13 and setting the regulator to operate at any desired pressure, but preferably not much in excess of twenty-five pounds per square inch. A further recovery of vapors due to distillation under pressure will result in a more volatile product in the receiving tank 12. In case distillation is carried out under pressure by means of a pressure regulator on line 13, the latter part of the distillation should be conducted at about atmospheric pressure since the more volatile vapors or the vapors which are more difficult to condense will be evolved during the first part of the distillation, while the less volatile or more readily condensable vapors will be given off during the latter part of distillation since the less volatile vapors are more difficult to remove from the activated charcoal, and since said vapors are more easily removed at the lower pressures.

If desired superheated steam may be introduced directly into the absorber during distillation as for example, by way of lines 14 and the vapors removed by this method of distillation or a combination of direct steam distillation and methods above described may be employed. In case direct steam distillation is employed, any moisture introduced to the activated charcoal by steam distillation may be removed after distillation is completed by passing denuded gas from residue line through the hot charcoal. This operation will also facilitate and expedite the cooling of the absorbent prior to using it over again.

I do not limit myself to the exact details of procedure as described and shown by the drawing, as obviously this drawing shows only one manner in which the process may be practiced. There are various ways in which the apparatus may be built to absorb vapors and recover them from a solid absorbing medium and various changes may be made in the process itself, without departing from the spirit of this invention. For example, it is obvious that the principles of the methods of recovery of hydrocarbon vapors by means of a solid absorbing medium may be so modified as to embody the principles of recovery by other processes, namely:—compression, refrigeration, and absorption by liquid absorbing media, which processes have been in practice for some time and follow established and well known physical laws.

This system has been described as used on natural gas for recovery of gasoline, but it is evident that the process is applicable for extraction and recovery of hydrocarbon vapors and derivatives thereof from various gaseous mixtures and it is my intention to include within my invention the treatment of such mixtures regardless of the source from which the mixture is derived.

What I claim and desire to secure by Letters Patent is:—

1. The process of recovering gasoline from natural gas which consists in contacting the natural gas with activated absorbent carbon in a solid state, whereby the gasoline is absorbed by the carbon, then subjecting the carbon and the absorbed gasoline to a distilling treatment to vaporize the gasoline, and finally condensing the gasoline.

2. The process of recovering gasoline from natural gas, which consists in flowing the natural gas in contact with comminuted absorbent carbon until the natural gas is substantially freed of its gasoline and then allowing it to escape from such contact, maintaining the carbon in the presence of flowing natural gas for a time sufficient to charge fully the first portion of the carbon with gasoline, then cutting off the flow of gas, subjecting the carbon in situ to treatment to carry off the gasoline from the carbon, collecting said gasoline in liquid form, and then flowing denuded natural gas into contact with such carbon.

3. The process of recovering gasoline from natural gas, which consists in causing the gas to travel in contact with particles of comminuted activated absorbent carbon until most of the gasoline content of the natural gas has been removed, and continuing the supply of fresh gas to the carbon until the rate of absorption of the gasoline by the carbon has materially lessened, then in the absence of the fresh natural gas, subjecting the carbon and its absorbed gasoline to heat to vaporize the gasoline, and condensing and collecting the latter.

4. The process of extracting hydrocarbon vapors from natural gas which has been passed through a gasoline extraction plant, and recovering said vapors in liquid form by contacting the said natural gas with activated carbon in a solid state whereby any vapors remaining in the gas are absorbed, then subjecting the carbon and the absorbed vapors to a distilling treatment and finally condensing the resultant vapors.

5. The process of recovering gasoline from natural gas, which consists in contacting the natural gas with activated carbon whereby the gasoline is absorbed by the carbon, then subjecting the carbon and the absorbed gasoline to a distilling treatment to vaporize the gasoline and finally condensing the gasoline vapors.

6. The process of recovering gasoline in commercial quantities, from natural gas, which consists in flowing the natural gas in contact with activated charcoal in comminuted form until the natural gas is substantially freed of its gasoline, and then allowing it to escape from such contact, maintaining the charcoal in the presence of flowing natural gas for a time sufficient to charge fully the first portion of the charcoal with gasoline, then cutting off the flow of gas, subjecting the charcoal in situ to treatment to carry off the gasoline from the charcoal, collecting said gasoline in liquid form, and then flowing denuded natural gas into contact with said activated charcoal.

In testimony whereof I affix my signature.

GEORGE G. OBERFELL.